United States Patent
Provitola

(10) Patent No.: US 6,934,856 B1
(45) Date of Patent: Aug. 23, 2005

(54) SYSTEM OF SECRET INTERNET WEB SITES FOR SECURING USER ACCESS

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

(21) Appl. No.: 09/536,625

(22) Filed: Mar. 28, 2000

(51) Int. Cl.[7] .................... G06F 11/30; G06A 12/14; H04L 9/00; H04L 9/32
(52) U.S. Cl. .................. 713/201; 709/217; 709/219; 709/206
(58) Field of Search .............. 713/201, 200, 713/202; 709/218, 219, 229, 217, 206, 223–225; 379/88

(56) References Cited

U.S. PATENT DOCUMENTS

| | | | | |
|---|---|---|---|---|
| 5,790,785 A | * | 8/1998 | Klug et al. | 713/202 |
| 5,790,793 A | * | 8/1998 | Higley | 709/218 |
| 5,793,972 A | * | 8/1998 | Shane | 709/219 |
| 5,961,645 A | * | 10/1999 | Baker | 713/201 |
| 6,141,413 A | * | 10/2000 | Waldner et al. | 379/88.17 |
| 6,145,002 A | * | 11/2000 | Srinivasan | 709/225 |
| 6,226,383 B1 | * | 5/2001 | Jablon | 380/30 |
| 6,360,254 B1 | * | 3/2002 | Linden et al. | 709/219 |
| 6,529,956 B1 | * | 3/2003 | Smith et al. | 709/229 |
| 2002/0029252 A1 | * | 3/2002 | Segan et al. | 709/217 |

* cited by examiner

*Primary Examiner*—Ayaz Sheikh

(57) ABSTRACT

A system of secret internet sites and an internet operation including such a system is used to permit access to the internet site operation of a particular internet site operator by persons intending to make normal use thereof when access to the site has been compromised by cybervandalism. This is accomplished by designation by a site operator of specific internet sites whose URLs are secret and have been assigned for the use of specific users who have previously identified themselves to the operator. A user's access to an operator's internet operation is thus secured when the operator's main site is under attack.

20 Claims, No Drawings

# SYSTEM OF SECRET INTERNET WEB SITES FOR SECURING USER ACCESS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

Most, if not all, publicly accessible internet web sites are vulnerable to denial-of-service attacks. The precautions, safeguards and security systems that have been applied cannot adequately prevent the disruption of service without limiting access, and such remedies may be overcome by skilled and even unskilled attackers. In order to keep the internet open with minimum regulation it is necessary to have a system that sufficiently deters such attacks while maintaining significantly reduced vulnerability to such attacks. The current firewall and intrusion detection systems are largely powerless to halt distributed denial-of-service attacks. Even though scanners can alert administrators to computers used as attack conduits, known as "zombies", it is impossible to prevent the use of unsecured computers by attackers for that purpose. Among other similarly expedient precautions, the provision of alternative connections in the event of an attack, are ineffective if the existence and the universal resource locators (URLs) of the alternative connections are public information. The use of alternative connections for activities such as downloading is common. However, all of such associated alternative web sites become publicly known through the main web site publicly associated with the operator. However, it is not necessary to forego the advantage of such web site publicity if a system is implemented that will secure a user's access to a particular internet operation when the operator's main site is under attack, and thereby deter such attacks in the first place by rendering them futile and dangerous for the attacker in terms of the probability of detection and apprehension of the attacker. The present invention is a system of secret internet web sites, and a method for the use thereof, that provides the security desired while maintaining the openness, freedom, and anonymity of the internet.

BRIEF SUMMARY OF THE INVENTION

The present invention is a system of secret internet web sites which may be used to provide access to the internet web site operation of a given internet web site operator by persons intending to make normal use thereof when such access to such an operation has been compromised by cybervandalism, such as a denial-of-service attack, and a method for the use of such a system. If the number of such secret sites for access to a particular operator's internet operation are sufficient, it becomes extremely difficult for a denial-of-service attacker to disable such an operation through other computers connected to the internet which are used by attackers as distributed attack conduits. The system may be used in any given internet operation. A user of such an internet operation employs the system contacting the operator for that purpose. At the time of such contact the user is given the option of subscription by providing adequate information for the identification of the user. The user may elect not to provide such information, in which case the user may remain anonymous and continue to access the main site of such an operation, or any other site which is identified with the operator through the main site or otherwise. If the user does elect to provide such information for identification, the operator provides the user with a specific internet web site for access to the operator's internet operation, the URL of which is assigned specifically for access by the user and to be held as secretly as a password, a "secret site". Otherwise the user is free to contact and use the operator's main site anonymously as generally permitted and desired. Access to an operator's internet operation by a user may also be obtained by the use of the secret site system when the operator's main site is under denial-of-service attack by subscription through other means of contact, such as another internet operation that specializes in providing emergency contact or an automated telephone subscription system.

DETAILED DESCRIPTION OF THE INVENTION

The present invention is a system of secret internet web sites which may be used to provide access to the internet web site operation of a given internet web site operator by persons intending to make normal use thereof when such access to such an operation has been compromised by cybervandalism, such as a denial-of-service attack, hereinafter referred to as an "attack", and a method for the use of such a system. The system which is the present invention will hereinafter be referred to as the "secret site system", and the term "system" as used hereafter shall refer to the secret site system unless otherwise indicated. As used in this disclosure a person intending to make normal use of an internet web site shall hereafter be referred to as a "user"; a person who attempts or engages in cybervandalism, such as a denial-of-service attack on an internet web site, shall hereafter be referred to as an "attacker"; and an entity which operates an internet web site publicly identified with that entity for the purpose of general and unrestricted initial access by the public shall hereafter be referred to as an "operator". An operator's internet web site which is publicly identified with a particular internet business or other activity of the operator shall hereafter be referred to as the "main site", which includes any other internet web site operated by the operator and publicly associated with such a main site; and the business or activity of the operator through a main site, including the authorship, programming and maintenance of the main site, shall be referred to as the operator's internet "operation".

For any given internet operation the system comprises a plurality of internet web sites, in addition to the main site of the internet operation, the URLs of which are not publicly associated with the operator, which shall hereinafter be referred to as "secret sites", that can provide access to the operator's internet operation conducted through the main site. The secrecy of a secret site derives from the fact that the URL for that site is maintained as a secret from all but those users who have been given the knowledge thereof by the operator, the URL then being held by the user as secretly as a password. Such knowledge is obtained by a user through assignment of a URL for a secret site by the operator to a user upon the user's request. The assignment of a secret site to a user is in response to the user providing means by which they can be sufficiently identified for purposes of the level of security against attack desired by the operator. Such assignment of a secret site may be coupled with other security measures such as passwords, encryption, and other software and hardware measures for detection and disruption of other forms of cybervandalism as well as the denial-of-service attack. If the number of such secret sites for access to a given operator's operation are sufficient, it becomes extremely difficult for an attacker to disable the service provided by the operator through "zombies", the internet connected computers used as distributed attack conduits.

Objects of the invention are to provide a system which secures access for users of an operator's internet web site operation when the operator's main site is under attack; thereby to effectively deter and thus prevent cybervandalism, such as denial-of-service attacks against publicly known web sites, by providing substantial opportunity for detection and apprehension of attackers.

The system operates with the cooperation of users who want to access the main site for the purpose of engaging the business or other internet activity of the operator. A user of such an internet operation employs the system by contact with the operator. The operator may be contacted through the operation's main site, by telephone, by mail, by e-mail, or by other means. At the time of such contact a user is given the option of subscription by providing adequate information for identification. If the user does elect to provide such information for identification, the operator provides the user with a specific internet web site with access to the operator's internet operation, the URL of which is secret for the user, a secret site. A secret site and its URL may be registered with the registration authority in any name lawfully useable by the operator, including fictitious names and controlled entities, with the object of avoiding association of the URL with the operator. The knowledge of the existence, identity and URL of a secret site are learned only through the process of subscription, such information not being otherwise available to the public. Subscription for the use of a secret site may be free, for a fee, or related to the regular fees otherwise charged for use of the main site by the operator. The user may elect not to provide such information for identification, in which case the user may remain anonymous and continue to rely upon access to the main site to engage the operator's operation, to the extent that the main site is available for access to users whose identity is not required. If such information is provided by a user, the extent of verification thereof is optional to the operator. Once the subscription process is complete the secret site may then be accessed by the user, if the user does not require anonymity for such access. In the event that the main site is under attack, the secret site may be accessed if the user decides that such access is necessary at that time and the user is willing to forego anonymity. Otherwise the user is free to contact and use the main site anonymously as permitted and desired, using the secret site only in an emergency.

Subscription by a user for assignment of a secret site for a particular internet operation may also be effected while the main site for that operation is under attack. This may be accomplished by telephone or other contact with the operator. Again, such contact would be for the purpose of subscribing to obtain the URL of a secret site upon meeting the operator's requirements for identification of the user. A telephone subscription system based on telephone contact may be automated to provide a secret site URL following the touch tone key-in or voice/data recognition of such information for identification of the user as required by the operator, again with possible verification thereof. Such contact would require a source of information for the telephone number of the operator's telephone subscription system, such as a telephone directory, which may be available on the internet. The preferred embodiment of the method for use of the system with respect to subscription by a user during an attack employs another internet operation, one completely independent of the operation on the main site, that specializes in providing emergency subscription for users to secret site URLs as a service to various operators or users; again, by a process of identification of the user which meets the requirements for the particular internet operation to which secret site access is requested by the user. The system also includes the maintenance of a reserve of secret sites that would go on line in the event of an emergency created by an attack which was directed to some of the secret sites, such as those for which the URLs were learned by subscription or by dissemination by subscribers among potential attackers. Such emergency URLs could be communicated to users by e-mail, telephone, fax or other means by which a user would expect such a communication from the operator in such an emergency.

Inasmuch as operation of the main site is conducted through the use of a computer known as a web server, which is programmed to receive and transmit information over the internet, the web server for the main site may be programmed to implement the system which is the present invention. Such a program shall hereinafter be referred to as the "secret site program". The system may be made available through a web page which includes a secret site program for user subscription and operator assignment of a secret site URL. A secret site URL is one for which the operator has lawful use, either exclusive or non-exclusive, and which, in a preferred embodiment, should not be registered with any search engine database or made public in any way in which the secret site may be associated with the main site or the internet operation conducted thereon. The secret site program queries the user for the identification required by the operator, and proceeds to assign one of the secret site URLs to the user. In a preferred embodiment the user's identification information would be verified by the secret site program. Also in a preferred embodiment for non-emergency situations, that is, when the main site is not under attack, the secret site URL can be furnished to the user by mail, e-mail, fax or other means following verification of the user's identification information. In emergency as well as non-emergency situations the means for communication of the secret site URL to the user further identifies the user, or does not communicate the secret site URL at all.

A person who is a potential attacker may themselves also acquire knowledge of the URL of a secret site, but they must identify themselves to acquire such knowledge or acquire such knowledge through another user who is so identified. Because cybervandalism is usually conducted with anonymity, any enhancement of the traceability of the attacker denies advantage to the attacker, and thus deters attacks as well as giving advantage to persons attempting to identify and apprehend the attacker.

The secret site assigned to the user should, in a preferred embodiment, be one of many web sites of which the operator has lawful use as secret sites. The more secret sites that are available to the operator for assignment, and the more evenly the access of the users are distributed over the secret sites, the less likely cybervandalism, such as a denial-of-service attack, will disrupt the operator's overall internet operation, even if the operation conducted through the main site is compromised by the attack.

The system which is the present invention significantly increases the effort that would be required to mount an attack. Because an attack must affect many secret sites of an operation simultaneously, the likelihood of detection and apprehension of the attacker is significantly increased, thereby discouraging the attack in the first place. Moreover, the fact that any effect of an attack on a main site would be significantly blunted by the distribution of the main site's operation over many secret sites is itself a deterrent.

The system also increases the likelihood that the attack could be halted much sooner than would otherwise be possible. To enhance the deterrent effect of the system certain of the secret sites may be set up primarily for detection of attack situations, because the only circumstance in which such a secret site would be accessed would be for some form of attack, because no person would have a legitimate reason to access the site except through error.

Public knowledge of the use of the system in a particular internet operation is a further deterrent against attacks on the main and secret sites of that operation. The greater the recognition by a potential attacker of the futility of their effort, with the realization of the resources that would be required to mount the attack, would eliminate all but the most dedicated of attackers. However, because the most dedicated attackers are the more likely to be skilled, such attackers would also recognize the greater likelihood of detection and apprehension. Moreover it will be recognized by skilled attackers that the openness of the fact of the use of the system does not compromise the strategies and tactics that may be employed in using the system for detection and apprehension of attackers. Such strategies or tactics need not be made public in relation to maintaining the deterrent effect of the system.

The preferred embodiment of the system comprises a plurality of computers connected to the internet, some of which are programmed to operate as web servers, and some of which may host one or more web sites, including main sites and secret sites. The preferred embodiment also includes client computers and web servers operating according to programs which monitor each of the web servers hosting web sites associated with the operator's internet operation, including the secret sites. With the use of this embodiment of the system an attack may be detected as it occurs, partly by denial of service to some of such monitors, and partly by analysis of the internet activity by the programs of the monitoring computers and the programs of the web servers hosting the main and secret sites. The system thus increases the likelihood that the attack could be halted much sooner than would otherwise be possible. To further enhance the deterrent effect of the system certain of the secret sites may be set up primarily as decoys or for detection of attack situations, because the only circumstance in which such a secret site would be accessed would be for some form of attack, because no person would have a legitimate reason to access the site except through error.

The web servers for the main and secret sites and the monitoring computers may also be programmed to communicate by a network protected by firewall programming of those computers. Such a firewall would have to protect against the intrusion into and disruption of the monitoring and response activity of the system, as well as restricting access to the other tasks that the computers may perform.

What I claim as my invention is:

1. An internet operation including a system of secret internet web sites comprising:
   (a) one or more computers programmed to operate as a plurality of web servers;
   (b) one or more of said web servers hosting internet web sites for said internet operation;
   (c) one or more of said internet web sites being main sites having URLs which are publicly associated with said internet operation accessible through said internet web sites;
   (d) one or more of said internet web sites being secret sites having URLs which are not publicly associated with said internet operation, and which:
      1. are maintained as a secret from all but those users who have been given the knowledge thereof by the operator of said internet operation; and
      2. are assigned to a user upon the user's request and in response to the user providing means by which they can be sufficiently identified for purposes of the level of security against attack desired by the operator of said internet operation;
   and wherein the knowledge of the existence, identity and URL of each of said secret sites is not available to the public except through a process requiring such identification of the user;
   said secret sites being a part of said internet operation by which said internet operation may be accessed.

2. The internet operation of claim 1 wherein the system of secret internet web sites is operated to secure said internet operation against cybervandalism.

3. The internet operation of claim 1 wherein the system of secret internet web sites is operated to secure said internet operation against denial-of-service attacks.

4. The internet operation of claim 1 wherein one or more of said secret sites are assigned to one or more users of said internet operation.

5. The internet operation of claim 1 wherein the URLs of secret sites are maintained as secret by entities authorized by the operator of the internet operation from all but those users who have been given the knowledge thereof by said operator.

6. The internet operation of claim 1 wherein the URL of a secret site is acquired by a user through assignment to a user by an entity authorized by the operator.

7. The internet operation of claim 1 wherein a secret site is one whose existence, identity and URL are learned by a user only through the process of subscription.

8. The internet operation of claim 1 wherein the user is free to contact and use the main site anonymously as permitted and desired.

9. The internet operation of claim 1 wherein a user may subscribe for a secret site URL, while the main site is under attack.

10. The internet operation of claim 1 wherein the telephone subscription system based on telephone contact is automated to provide a secret site URL.

11. The internet operation of claim 1 wherein subscription by a user during an attack is through another internet operation which is independent of the internet operation which includes said main sites.

12. The internet operation of claim 1 wherein a reserve of secret sites is maintained that become available to the users of said internet operation in the event of an emergency created by an attack.

13. The internet operation of claim 1 wherein the secret site program queries the user for the identification, verifies the information, and proceeds to assign one of the secret site URLs to the user.

14. A system of secret internet websites, comprising:
   (a) one or more computers programmed to operate as a plurality of web servers;

(b) one or more of said web servers hosting internet web sites for an internet operation;

(c) one or more of said internet web sites being secret sites having universal resource locators (URLs) which are not publicly associated with any internet operation, and which:

1. are maintained as a secret from all but those users who have been given the knowledge thereof by the operator of said internet operation; and 2. are assigned to a user upon the user's request and in response to the user providing means by which they can be sufficiently identified for purposes of the level of security against attack desired by the operator of said internet operation;

and wherein the knowledge of the existence, identity and URL of each of said secret sites is not available to the public except through a process requiring such identification of the user;

said secret sites being a part of said internet operation by which said internet operation may be accessed.

15. The system of secret internet web sites of claim 14 wherein the system of secret internet web sites is operated to secure other internet operations against cybervandalism.

16. The system of secret internet web sites of claim 14 wherein the system of secret internet web sites is operated to secure other internet operations against denial-of-service attacks.

17. The system of secret internet web sites of claim 14 wherein the URLs of secret sites are maintained as secret by entities authorized by the operator of said system from all but those users who have been given the knowledge thereof by said operator.

18. The system of secret internet web sites of claim 14 wherein the telephone subscription system based on telephone contact is automated to provide a secret site URL to subscribing users.

19. The system of secret internet web sites of claim 14 wherein a reserve of secret sites is maintained tat become available to the users of internet operation served by such a system in the event of an emergency created by an attack.

20. An internet operation including a system of secret internet web sites comprising:

(a) one or more computers programmed to operate as a plurality of web servers;

(b) one or more of said web servers hosting internet web sites for said internet operation;

(c) one or more of said internet web sites being main sites having URL-S which are publicly associated with said internet operation accessible through said internet web sites;

(d) one or more of said internet web sites being secret sites having Ultt.s which are not publicly associated with said internet operation; wherein each of said secret sites have a URL which:

1. is maintained as a secret from all but those users who have been given the knowledge thereof by the operator of said internet operation; and 2. is assigned to a user upon the user's request and in response to the user providing means by which they can be sufficiently identified for purposes of the level of security against attack desired by the operator of said internet operation;

and wherein the knowledge of the existence, identity and URL of each of said secret sites is not available to the public except through a process requiring such identification of the user;

said secret sites being a part of said internet operation by which said internet operation may be accessed.

\* \* \* \* \*